US006526039B1

(12) United States Patent
Dahlman et al.

(10) Patent No.: US 6,526,039 B1
(45) Date of Patent: Feb. 25, 2003

(54) METHOD AND SYSTEM FOR FACILITATING TIMING OF BASE STATIONS IN AN ASYNCHRONOUS CDMA MOBILE COMMUNICATIONS SYSTEM

(75) Inventors: Erik Bengt Lennart Dahlman, Bromma (SE); Karim Jamal, Tokyo (JP); Johan Anders Nyström, Stockholm (SE); Mats Cedervall, Vallentuna (SE); Patrik Lundqvist, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/243,095

(22) Filed: Feb. 2, 1999

Related U.S. Application Data
(60) Provisional application No. 60/074,494, filed on Feb. 12, 1998.

(51) Int. Cl.[7] .......................... H04B 7/216; H04B 1/713
(52) U.S. Cl. ....................... 370/350; 370/342; 375/150; 375/152; 375/142; 375/143; 455/456
(58) Field of Search ................................ 370/342, 335, 370/350; 375/145, 149, 140, 142, 143, 180, 152; 455/501, 502, 500, 442, 67.6, 524, 456

(56) References Cited

U.S. PATENT DOCUMENTS

| 5,440,561 A | 8/1995 | Werronen ................... 370/337 |
| 5,828,659 A * | 10/1998 | Teder et al. ................. 370/342 |

(List continued on next page.)

FOREIGN PATENT DOCUMENTS

| EP | 0 241 565 | 10/1987 | ............ H04Q/7/04 |
| WO | 94/30024 | 12/1994 | ............ H04Q/7/04 |
| WO | 97/47148 | 12/1997 | ............ H04Q/7/32 |

OTHER PUBLICATIONS

TIA–EIA Interim Standard, *Mobile Station—Base Station Compatibility Standard for Dual–Mode Wideband Spread Spectrum Cellular System*, TIA/EIA/IS–95–A, May 1995.
A. Baier, et al., "Design Study for a CDMA–Based Third––Generation Mobile Radio System," *IEEE JSAC*, vol. 12, pp. 733–743, May 1994.

(List continued on next page.)

*Primary Examiner*—William Trost
*Assistant Examiner*—Rafael Perez-Gutierrez
(74) *Attorney, Agent, or Firm*—Jenkens & Gilchrist, PC (57) ABSTRACT

A method and system are disclosed for facilitating the timing (e.g., the known relative timing differences) of base stations (BSs) in asynchronous CDMA mobile communications systems. A plurality of mobile stations (MSs) measure the relative time differences between various pairs of BSs, and these measurements are stored by the BSs. A source BS sends to an MS, in a neighbor list message, estimates of the relative time difference between the source BS and each of the BSs on the neighboring cell list. Each BS on the list can maintain a relative time difference estimate table, which can be updated continuously from the reports received from MSs. Subsequently, the BSs can send entries from this table to the MS in the neighbor list message. Using this novel technique, the BSs have known relative timing differences. Consequently, when the MS initiates a cell-search for a candidate BS, the MS already has an estimate of the timing of that BS as compared to its source BS. As such, the resulting cell-search procedure has a lower level of complexity and thus can be accomplished much quicker than with prior procedures. In addition, the relative time difference estimates can be compared with corresponding time differences that are measured by a second mobile station. Based on this comparison, the propagation delays of signals between the second MS and various BSs can be calculated to determine the position of the second MS.

42 Claims, 4 Drawing Sheets

U.S. PATENT DOCUMENTS

| | | | |
|---|---|---|---|
| 5,859,612 A | * 1/1999 | Gilhousen | 342/457 |
| 5,872,774 A | * 2/1999 | Wheatley, III et al. | 370/335 |
| 5,991,330 A | * 11/1999 | Dahlman et al. | 370/509 |
| 6,072,847 A | * 6/2000 | Dupuy et al. | 375/356 |
| 6,097,709 A | * 8/2000 | Kuwabara | 370/350 |
| 6,101,175 A | * 8/2000 | Schorman et al. | 370/350 |
| 6,151,311 A | * 11/2000 | Wheatley, III et al. | 370/335 |
| 6,208,871 B1 | * 3/2001 | Hall et al. | 370/335 |
| 6,246,673 B1 | * 6/2001 | Tiedemann, Jr. et al. | 370/335 |
| 6,259,683 B1 | * 7/2001 | Sekine et al. | 370/350 |
| 6,307,840 B1 | * 10/2001 | Wheatley, III et al. | 370/335 |
| 2001/0021179 A1 | * 9/2001 | Tiedmann, Jr. et al. | 370/335 |
| 2001/0022779 A1 | * 9/2001 | Wheatley, III et al. | 370/350 |
| 2001/0046240 A1 | * 11/2001 | Longoni et al. | 370/328 |

OTHER PUBLICATIONS

"Concept Group Alpha—Wideband Direct–Sequence CDMA (WCDMA)," *Evaluation Document* (in four parts), ETSI SMG Meeting No. 24, Madrid, Dec. 15–19, 1997.

PCT International Search Report, mailed May 18, 1999.

* cited by examiner

METHOD AND SYSTEM FOR FACILITATING TIMING OF BASE STATIONS IN AN ASYNCHRONOUS CDMA MOBILE COMMUNICATIONS SYSTEM

RELATED APPLICATION

This application claims the benefit of the filing date of U.S. Provisional Application No. 60/074,494, filed Feb. 12, 1998.

BACKGROUND OF THE INVENTION

1. Technical Field of the Invention

The present invention relates in general to the mobile communications field and, in particular, to a method and system for facilitating the timing of base stations in an asynchronous Code-Division Multiple Access (CDMA) mobile communications system.

2. Description of Related Art

Direct-Sequence CDMA (DS-CDMA) mobile communications systems can be either inter-cell synchronous or inter-cell asynchronous systems. In other words, the base stations (BSs) in an inter-cell synchronous system are accurately synchronized with one another, and the BSs in an inter-cell asynchronous system are not. More specifically, asynchronous BSs do not share a common time reference, and their transmissions, therefore, have arbitrary, not predetermined timing relative to each other. An example of an inter-cell synchronous system is the North American IS-95 system. Examples of inter-cell asynchronous systems are the Wideband CDMA (WCDMA) systems proposed in the CODIT, ETSI SMG2 Group Alpha, and ARIB technical specifications.

The main disadvantage of inter-cell synchronous systems is that the BSs have to be very accurately synchronized (down to the $\mu$s level). This high level of accuracy is typically provided through the use of highly accurate time references co-located with the BSs, such as Global Positioning System (GPS) receivers. However, because of the line-of-sight nature of satellite signal propagation, the use of such co-located references are likely not feasible for BSs located underground, in buildings or tunnels. Another related disadvantage is that the GPS system is controlled by a government agency. Consequently, the use of GPS receivers for BS network synchronization may be undesirable in some national regions. These disadvantages are the main reasons why inter-cell asynchronous systems are now being considered.

For inter-cell asynchronous systems to work properly, there are two crucial functional issues that need to be addressed: (1) Soft Handovers (SOHOs); and (2) Cell-Searches. In a state of SOHO, a mobile station (MS) is in communication with more than one BS at the same time. To facilitate the SOHOS, the MS constantly scans for other BSs in the vicinity. The MS can thereby monitor the received signal quality from the multiple BSs and determine the time delay of the BSs. For a SOHO to occur, the MS being handed over has to be able to receive the "target" BS's signal at approximately the same time as the "source" BS's signal, in order to minimize buffering requirements (i.e., a smaller time difference between BS signals requires less buffer area than larger time differences). Also, the target BS has to be able to find the MS's signal without an unreasonable expenditure of processing resources.

These SOHO issues are resolved for asynchronous systems by a "per-call" synchronization technique, which is disclosed in "A Design Study for a CDMA-Based Third-Generation Mobile Radio System," by A. Baier et al., *IEEE JSAC*, Vol. 12, pp. 733–743, May 1994. Using this technique, the MS involved in the SOHO calculates and reports to the network the time difference between the target BS and source BS. The network notifies the target BS via the Base Station Controller (BSC) or Radio Network Controller (RNC) about the time difference. The target BS can then adjust its receive and transmit timing for the signal intended for the MS involved, to compensate for the difference.

A similar known SOHO technique is used in which the MS reports the timing difference between the target BS's transmission and its own transmission, rather than the difference between the target BS's transmission and the source BS's transmission. However, since the MS's transmit/receive timing relationship is always fixed, the two above-described SOHO techniques are essentially equivalent. These techniques are referred to as mobile assisted handover (MAHO). In other words, the MS assists the target BS in compensating for the difference in timing between the target BS and source BS.

A cell-search generally refers to a procedure whereby an MS accomplishes chip-, slot- and frame-synchronization with a BS, and detects the BS's downlink scrambling code. This procedure is used both during power on (initial synchronization) and continuously thereafter during the idle or active modes while the MS is searching for SOHO candidate BSs. In a synchronous system, the cell-search can be performed efficiently (i.e., with a relatively low level of complexity) because the same scrambling code can be used by all BSs. As such, the MS can perform the complete search for BSs using only a single matched filter (or a similar functionality). However, this same technique cannot be readily used in an asynchronous system because of the different scrambling codes used by the different BSs. Consequently, a need has arisen for a low-complexity, rapid cell-search procedure for asynchronous CDMA systems.

A rapid, multi-step cell-search procedure for asynchronous CDMA systems has been proposed, whereby each BS transmits one unmodulated symbol. This transmitted symbol is spread by a globally-known short code, without a scrambling code, in each slot of each frame. In one such proposal, this symbol is denoted as a "Perch 1 Long Code Masked Symbol (LCMS)". In a second proposal, this symbol is denoted as a "Primary Synchronization Channel" or Primary (SCH). With the proposed multi-step procedure, an MS can thus find the chip- and slot-timing of a BS, using a single matched filter which is matched to the Primary SCH. Subsequently, the MS still has to find the BS's frame-timing and downlink scrambling code (which spans one frame in the proposed multi-step procedure). The MS can find the BS's frame-timing by detecting a second regularly transmitted symbol, which is denoted as a "Perch 2 LCMS" or "Secondary SCH".

This second symbol is transmitted in parallel with the first symbol, but the second symbol is spread by a second short code (again without a scrambling code). The second symbol may also have a unique repetitive modulation pattern per frame, and by detecting this pattern, the MS can determine the BS's frame-timing. The spreading code used for the second symbol indicates to the MS which group of possible scrambling codes an actually-used scrambling code belongs to. The MS can then find the scrambling code used, by correlating with the scrambling codes belonging to the indicated group, at the above-identified frame-timing (or at different possible frame-timings). However, a problem with the proposed multi-step procedure is that the level of complexity of the cell-search is still relatively high, especially in the case of a SOHO candidate search (which the MS has to perform on a regular basis).

Another problem with inter-cell asynchronous systems is that the timing difference between BSs makes it difficult to determine the position of the MSs. Mobile communications systems capable of determining the position of MSs in the system are becoming increasingly desirable. Currently, mobile positioning is generally performed by the use of external systems, such as a GPS system. Preferably, however, mobile positioning would be performed by the cellular system itself without the need for such external systems. To perform such cellular positioning, a method is needed to accurately determine the absolute or relative distances between an MS and each of several different BSs. The distances can be calculated using propagation time, time of arrival (TO), or time difference of arrival (TDOA) measurements on the signals transmitted between the MSs and each of several different BSs. Once these measurements are available, a number of algorithms exist to calculate the geographical position of the MS. For example, according to the TOA method, the distance from an MS to each of the BSs is obtained using TOA measurements. Each of these distances can be conceptualized as the radius of a circle with the respective BS in the center. In other words, the TOA measurement can be used to determine the radial distance of the MS from a particular BS, but the direction cannot be determined based on a single TOA measurement; thus, the MS might lie anywhere on the circle defined by the calculated radius. By determining the intersection of the circles associated with each of several different BSs, however, the position of the MS can be determined. The TDOA method, on the other hand, uses the difference in TOA between two BSs to determine a TDOA between those two BSs. The position of the MS can then be estimated to be along a curve, namely a hyperbola, in accordance with the TDOA calculation. By using three or more BSs, more than one such curve can be obtained. The intersection of these curves gives the approximate position of the MS.

In the simplest mobile positioning technique, a SOHO is made to a number of BSs. During each of these handovers, the propagation time between each BS and the MS can be measured. The location of the MS can then be determined by triangulating the position of the mobile. This positioning method is the simplest to implement because it involves very little change in the mobile radio design. In addition, the BSs do not need an absolute time reference; i.e., this method may be used in an asynchronous cellular system. However, because of the geographical separation between BSs, handover to two other geographically located BSs is only possible in a small number of cases. In other words, when the MS is in close proximity to one BS, a SOHO with other BSs will often not be possible. This is because the "hearability" of signals between the MS and multiple BSs will normally be unsatisfactory.

Another possible solution is to use an antenna array at the BS. When the BS has an antenna array, the position of the MS can be calculated by estimating the direction from which uplink signals are propagating and by measuring the round-trip delay of the communications signal. In this method, the MS only needs to be in communication with one BS to calculate the position. However, widespread use of antenna arrays for positioning purposes is expensive. Furthermore, the effects of multipath propagation characteristics of the uplink and downlink signals often make an antenna array undesirable, particularly in cities, where signals frequently reflect off buildings and other structures.

As mentioned above, it is also possible that a GPS can be incorporated into the mobile without using an extra radio receiver. This method, however, requires excessive computational and receiver complexity in the MS.

Another solution is to measure the propagation time, TOA, or TDOA of signals transmitted by the BSs to the MS or by the MS to the BSs. For example, a downlink solution can be used wherein, in the case of CDMA, the MS measures the TOA of pilot channel data that is transmitted by several different BSs. Alternatively, an uplink solution can be used wherein several BSs each measure the TOA of a signal transmitted by the mobile to the multiple BSs. However, both of these methods require an absolute or accurate relative time reference in, or synchronization of, the BSs. Therefore, both downlink and uplink solutions normally require extra hardware (e.g., a GPS receiver located in the BSs to obtain timing of the BSs) in an asynchronous network.

A system and method are needed for reducing the complexity of and the processing resources used during the cell search and mobile positioning processes in asynchronous networks. In particular, it would be advantageous to utilize as much a priori search information as possible to help reduce the level of complexity and increase the search rate for cell-searches and to enable simplified mobile positioning solutions. As described in detail below, the present invention successfully resolves the above-described problems.

SUMMARY OF THE INVENTION

A method and system are provided for facilitating the timing of base stations in asynchronous CDMA mobile communications systems, whereby a source BSC (or RNC) sends to an MS (e.g., in a neighbor cell list message) estimates of the Relative Time Difference (RTD) between the source BS and each of the BSs on the neighboring cell list. For SOHO purposes, a plurality of MSs can report to the network the estimated RTDs along with signal quality information for the neighboring BSs. Each BS can maintain an RTD estimate table, which can be updated continuously from the RTD reports received from the MSs. Subsequently, the BSs can send entries from this RTD estimate table to the MS in the neighboring cell list message, along with corresponding scrambling codes. Using this novel technique, the BSs have known relative timing differences. Consequently, when the MS initiates a cell-search for a potential target BS, the MS already has an estimate of the timing of that BS as compared to its source BS. As such, the resulting cell-search procedure used in an asynchronous CDMA system has a lower level of complexity and thus can be accomplished much quicker than with prior procedures.

In another aspect of the invention, the accuracy of the estimated RTD's can be greatly improved by accounting for propagation delays between the MS and the BSs that are used to estimate the RTD. These improved RTDs can be used to further improve timing estimates for performing cell-searches. The improved RTDs can also be used to calculate the position of MSs in the mobile communications system. Once highly accurate RTDs are known, distances between an MS and several BSs can easily be determined using the propagation times, TOAs, or TDOAs of signals traveling between the MS and the several BSs.

An important technical advantage of the present invention is that neighboring BSs in an asynchronous CDMA mobile communications system have known relative timing differences.

Another important technical advantage of the present invention is that the hardware and software complexity of MSs in an asynchronous CDMA mobile communications system is reduced.

Yet another important technical advantage of the present invention is that the overall level of complexity of the cell-search procedure in an asynchronous CDMA mobile communications system is significantly reduced.

Still another important technical advantage of the present invention is that the speed of the cell-searches performed in asynchronous CDMA mobile communications systems is significantly increased as compared to prior procedures.

Another important technical advantage of the present invention is that mobile positioning can be determined in an asynchronous mobile communications system by performing simple calculations on easily obtainable data and without the need for an external system.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–5 of the drawings, like numerals being used for like and corresponding parts of the various drawings.

Essentially, in an asynchronous CDMA system, a BSC "knows" the downlink scrambling codes for all of its BSs. Typically, a list of neighboring cells is broadcast in each cell (for MSs operating in the idle mode), or transmitted on a dedicated control channel (for MSs operating in the active mode). When an MS receives the neighboring cell information, it determines the scrambling codes of the listed neighboring cells that are potential SOHO candidate cells. Having such a priori knowledge of this scrambling code information for the candidate SOHO cells enables the MS to reduce the total SOHO cell-search time (or complexity level), because the number of possible scrambling codes is reduced in comparison with the number for initial synchronization (power on). However, even if the set of scrambling codes to be searched by the MS is relatively small, the MS still does not know the timing of these codes. This lack of timing information is the main reason why current proposals for an asynchronous system cell-search take more time (and are more complex) than a synchronous system cell-search.

The present invention solves this lack of timing information problem by having the source BS send to the MS (along with the neighboring cell list) an estimated RTD between the source BS and each of the BSs on the neighboring cell list. In other words, instead of sending only the scrambling codes of the neighboring BSs to the MS, the source BS also transmits each of their estimated RTDS. For SOHO purposes, the MSs can report (on a regular basis, triggered by some event, or on demand from the BSC) to the network the estimated RTDs along with signal quality information (e.g., signal strength, signal-to-interference ratio or SIR, etc.) for the neighboring BSs. Consequently, each BSC can maintain an RTD estimate table, which can be updated continuously from the RTD reports received from the MSs. In a preferred embodiment of the present invention, the RTD estimate table is maintained in a database at the BSC.

Subsequently, the BSCs can send entries from this RTD estimate table to the MS in the neighboring cell list message, along with the corresponding scrambling codes (with the BSC keeping track of the estimated RTD information it has already sent in previous messages to the MS). Using this novel technique, the BSs have known relative timing differences. Consequently, in an exemplary embodiment, when an MS initiates a search for a potential target BS, the MS already has an estimate of the timing of that BS (i.e., from the RTD information) as compared to its source BS. As such, the resulting cell-search procedure used in an asynchronous CDMA system can be accomplished much quicker than with prior procedures. When the MS has synchronized with the potential target BS, the MS has an improved estimate of the RTD, which in turn, the MS can report back to the source BS (preferably along with quality information for the potential target BS). The source BS (or its associated BSC) can then update this entry in the RTD estimate table.

Figure 1:
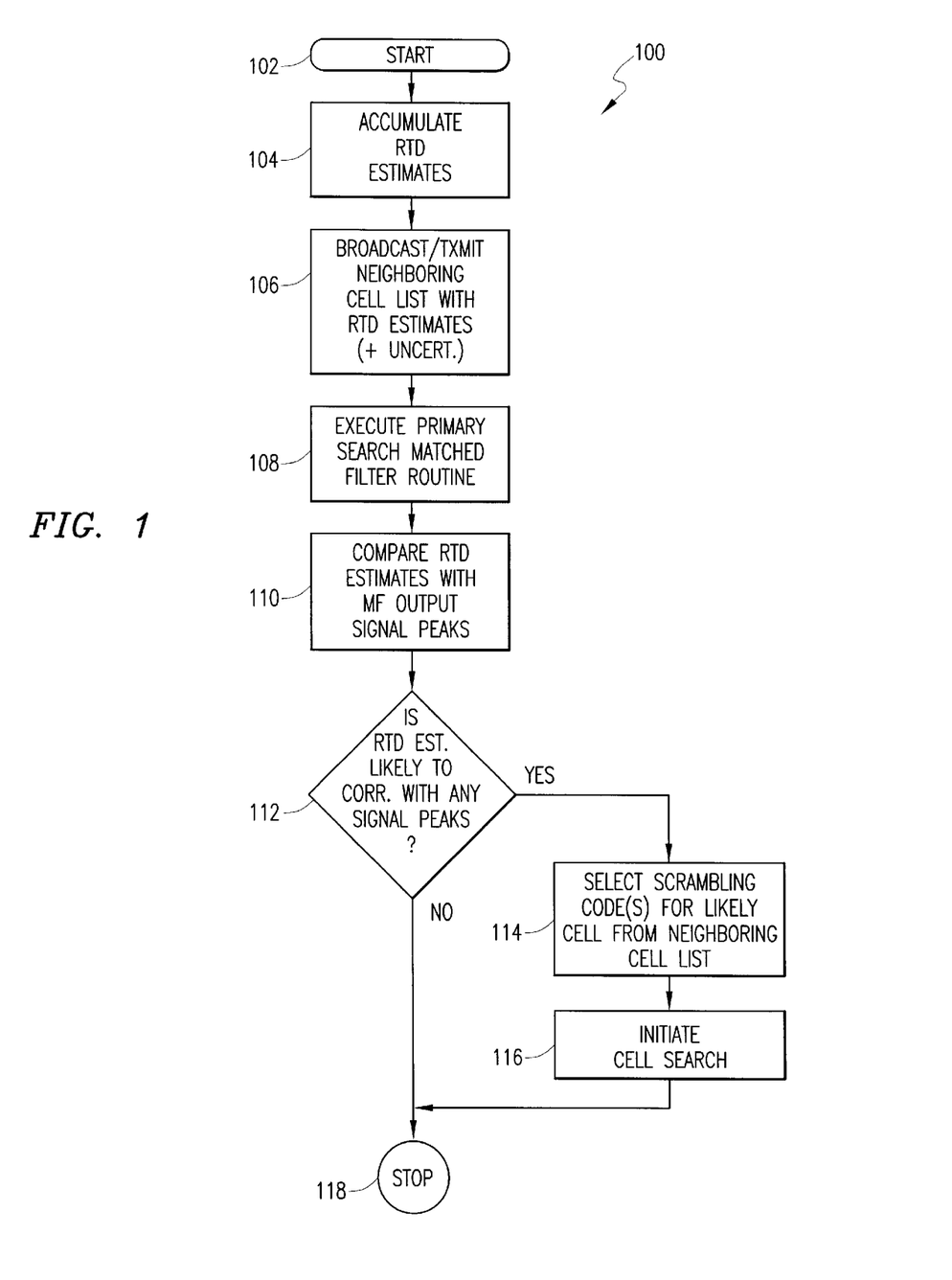
FIG. 1 is a flow diagram that illustrates an exemplary method that can be used for facilitating the timing of base stations in an asynchronous CDMA mobile communications system, in accordance with a preferred embodiment of the present invention.

More specifically, FIG. 1 is a flow diagram that illustrates an exemplary method 100 that can be used for facilitating the timing of BSs and increasing the speed of hand-over candidate cell-searches in an asynchronous CDMA mobile communications system, in accordance with a preferred embodiment of the present invention. At step 104 of the exemplary method shown in FIG. 1, a BSC prepares a neighbor cell list (e.g., "neighbor set" in an IS-95 system) with respective scrambling codes, along with a plurality of RTD estimates between a source BS and the respective hand-over candidate BSs from an RTD estimate table (preferably maintained in a database at the BSC). At step 106, the source BS broadcasts or transmits the neighbor cell list with scrambling codes and RTD estimates in a "neighbor list message" to the MS involved. In actuality, the BSC keeps track of the estimated RTDs it sends to the MS, in order not to unnecessarily duplicate RTD information the MS may already have. At this point, the MS has now received a list of the BSs it can synchronize with (and also report quality information for). The received neighbor list message can also include an uncertainty estimate (described in more detail below). The MS stores the neighbor cell list information in local memory.

At step 108, with the a priori neighbor cell RTD estimate (timing) information readily at hand, along with the other corresponding neighbor cell information, the MS can initiate a primary cell-search using a conventional matched filter arrangement. The MS's utilization of the primary cell-search matched filter produces signal peaks that correspond to the BSs that the MS can receive with sufficient quality to qualify as hand-over candidate cells. At step 110, the MS correlates the RTD estimates with the produced matched filter signal peaks to determine which peaks are most likely to correspond to which scrambling codes in the neighbor cell list (step 112). At step 114, based on the correlations produced at step 112, the MS can select the scrambling codes for the most likely hand-over candidate cells from the neighbor cell list. The MS can then initiate the cell-search (step 116).

Theoretically, if the above-described RTD estimates are perfectly accurate, then the MS could (up-front) discard all of the matched filter output signal peaks not corresponding to the RTD "estimate" information. In this hypothetical situation, the scrambling code correlation procedure (e.g., step 112) could be omitted altogether. However, in any event, in accordance with the present invention, the MS's utilization of the RTD estimates to determine the most likely hand-over candidate cells from the neighbor cell list enables the MS to disregard a significant number of the matched filter peaks, and/or associate certain of those peaks with corresponding scrambling codes, which significantly reduces the complexity of the cell-search procedure and substantially increases the speed of the search.

By using the above-described inventive method, each BS (cell), with the assistance of the MSs connected to it, has a known relative timing difference with respect to its neighbor BSs (cells). If, for some reason, there are no MSs connected to a particular BS, the RTD estimate table corresponding to that BS is not updated. Consequently, since the relative timing between the neighboring BSs may be continually shifting, the uncertainty (or variance) of the RTD estimate table entries for this BS will increase. In general, the uncertainty of the RTD estimate may increase with time, but this uncertainty is typically minimal immediately after an update has been completed (e.g., based on an RTD report received from an MS). Consequently, in order for the communications system to be more robust during periods of MS inactivity (e.g., at night, or during holidays in private indoor systems), as mentioned earlier, an RTD uncertainty estimate can be broadcast or transmitted from the BS along with the RTD estimate, in the neighbor list message. The MS can then, for example, set (e.g., increase) its time-search window accordingly to allow for the additional level of uncertainty. The MS can thus cope with those BSs having a relatively uncertain knowledge of its RTDs, and also minimize its complexity level when relatively certain RTD estimates have been provided.

An additional method for further mitigating the uncertainty problem encountered when there are too few active MSs for relatively long periods is to place "dummy" MSs at fixed locations throughout the system. These "dummy" MSs can have a limited functionality, and can be called upon by BSs having relatively high uncertainty RTD estimate table entries to provide more current RTD updates. Such "dummy" MSs can be thus advantageously located where they can be reached by a plurality of BSs (e.g., near the cell borders).

Figure 2:
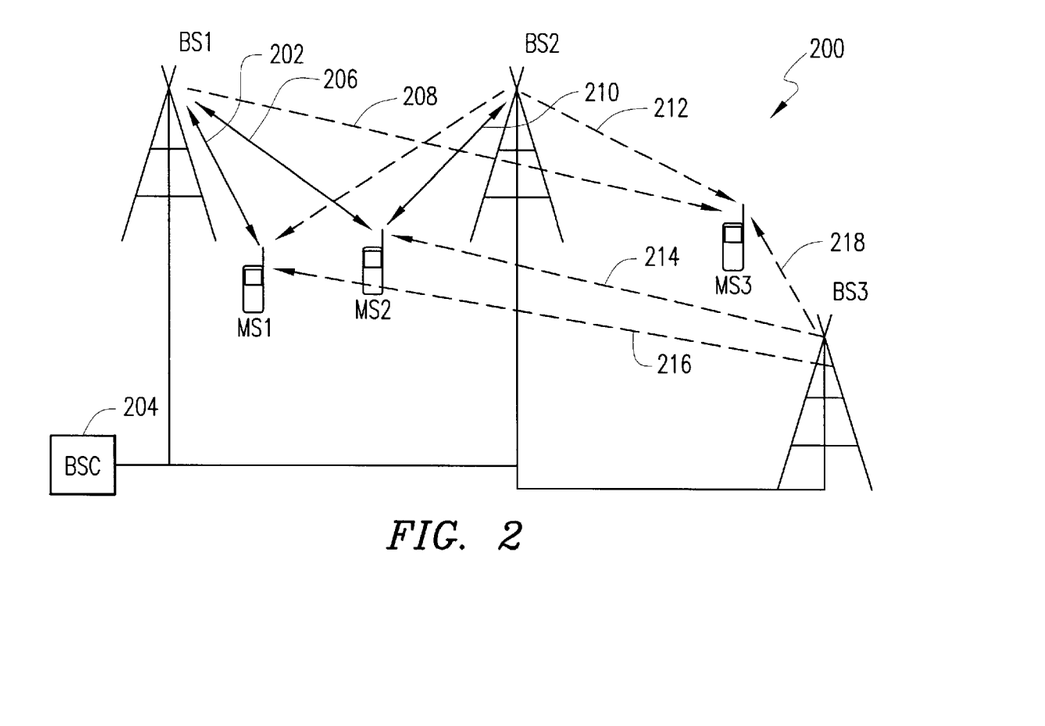
FIG. 2 is a simplified block schematic diagram of an exemplary mobile communications system that can be used to implement the method shown in FIG. 1, in accordance with the preferred embodiment of the present invention.

FIG. 2 is a simplified block schematic diagram of an exemplary mobile communications system 200 that can be used to implement the method 100 (FIG. 1) for facilitating the timing (e.g., the known relative timing differences) of BSs and increasing the speed of cell-searches, in accordance with the preferred embodiment of the present invention. System 200 is preferably an asynchronous CDMA mobile communications system that includes, for illustrative purposes, three BSs and three MSs. However, it should be understood that the number of BSs and MSs shown is for illustrative purposes only, and that a typical system can include more than three BSs and three MSs. For this example, MS1 is operating in the active mode and connected via air interface link 202 to BS1. In accordance with step 106 of method 100 (FIG. 1), MS1 has received a neighbor list message preferably including respective RTD estimates and, optionally, associated uncertainty estimates on a dedicated control channel from the BSC 204 (via BS1 once it is "connected" to MS1). At least two of the neighbors (cells) listed as entries in the RTD estimate table are BS2 and BS3. On a periodic basis (or on demand), MS1 monitors and reports the quality (signal strength, SIR, signal-to-noise ratio or SNR, Bit-Error-Rate or BER, etc.) of those BSs to the BSC 204 (via BS1). Since MS1 has received RTD estimates from BSC 204 (via BS1), MS1 can synchronize itself relatively rapidly with BS2 and BS3, at least during the first occasion when MS1 searches for BS2 and BS3. When MS1 has synchronized with BS2 (or BS3), it can be assumed that MS1 has a "good" RTD estimate for that BS. On a periodic basis, or on demand, MS1 can report the estimated signal quality of at least one of the entries in the neighbor cell list to BSC 204 (via BS1). In addition to the quality estimates, MS1 can also report the current RTD estimate to BSC 204.

The cell-search situation for MS2 is similar to that of MS1, except for the example shown, MS2 is involved in a SOHO with both BS1 and BS2, and monitors only one other BS (e.g., BS3 via air interface link 214). For this example, MS3 is operating in the idle mode (has no connection set up), but it can still monitor the BSs according to the neighboring-cell list received on the broadcast channel of the BS the MS3 considered the "best one" to listen to (e.g., in this case BS3 via air interface link 218). As such, MS3 can also monitor BS1 (via air interface link 208) and BS2 (via air interface link 212). Again, the RTD estimates broadcast by BS3 assists MS3 in synchronizing more rapidly with BS1 and BS2, or at least the first time the synchronization procedure occurs. The complexity of the cell-searches are thus reduced, and the speed of the cell-searches is thereby significantly increased.

Preferably, each MS operating in the mobile communications system 200 will transmit its measured RTD estimate on a periodic basis, or on demand, to the BSC 204 (via BS1). The BSC 204 stores the RTD estimates received from the MSs in an RTD estimate table. Alternatively, each entry stored in the RTD estimate table (i.e., representing an estimated difference between a pair of base stations) can be calculated based on estimates received from a plurality of different MSs. For example, the stored estimate can constitute an average of the previous x received estimates, or of the estimates received in the preceding y minutes. The values in the table can be updated by replacing previous estimates or by recalculating particular estimates based on newly received data. The values stored in the table are then sent to other MSs, as described above, along with the neighbor cell list, to assist in synchronizing those MSs with neighboring BSs, as necessary. In addition, it will be appreciated by those skilled in the art that the RTD estimate table does not have to be stored in the BSC 204; rather, the table can be stored in one or more databases located virtually anywhere in the network (e.g., in a register associated with the MSC or in an entirely separate database).

In another aspect of the invention, the RTD estimates can be used to determine the position of the MS. Positioning calculations, however, require more accurate RTD estimates than in the case of cell searches. This is because the mobile positioning concept essentially relies upon a determination of the propagation delay between the MS and each of a plurality of BSs or upon TOA or TDOA measurements among the various BSs. In most cases, the speed of the cell search can be significantly improved without having to account for propagation delays. Thus, it is normally sufficient to base the RTD estimates on the time difference between two BSs as measured by one or more mobiles without considering the effect of propagation delays of the downlink signals received by an MS from each of the BSs. To perform mobile positioning, on the other hand, a more accurate estimate of the RTD is needed.

The present invention solves this problem by calculating an improved RTD that accounts for the propagation delays of uplink and downlink signals. Essentially, the improved RTD is the difference between the time at which a first BS begins transmitting its downlink signal and the time at which a second BS begins transmitting its downlink signal. This improved RTD estimate can be calculated using: (1) the local receive and transmit times of the uplink and downlink signals in the BSs of interest, as measured at each of the respective BSs, and (2) the TOA difference at the MS of the downlink signals from the BSs, as reported by the mobile. This improved RTD information can then be used by other mobiles for positioning purposes.

In a preferred embodiment, the improved RTD estimates are stored in a database table at the BSC or the MSC. Subsequently, a position determination for a second MS is desired (on a regular basis, triggered by some event, or upon request by the BSC or the MS). The second MS measures the time differences between the BSs based on the receive time at the second MS of the downlink signal from each BS and reports the measured time differences to the BSC. The BSC then compares the stored improved RTD estimate between a particular pair of BSs with the measured time difference between the same pair of BSs as reported by the MS. Based on this comparison, the propagation delays between each of several BSs and the MS can be calculated, and an accurate determination of the MS's location can be made. Again, TOA or TDOA measurements can also be used to determine the location. Regardless of which positioning method is used, however, the positioning calculations essentially rely upon the existence of propagation delays in the mobile environment.

Generally, the determination of each RTD estimate by an MS involves only two BSs, even if a three-part SOHO (i.e., a SOHO involving three different BSs) can occur. By repeating the RTD determination during multiple different SOHO procedures, an improved, estimated RTD between a substantial number of possible pairs of BSs can be determined. The improved RTD estimates are normally then used by other MSs (i.e., MSs that were not involved in the estimated RTD calculations) to determine the position of those other MSs. it will be appreciated, however, that the position of an MS that was involved in the estimated RTD calculations can also be determined using the improved RTD estimates. In any event, the positioning procedure preferably utilizes as many BSs as possible in order to improve the accuracy of the estimated location.

Figure 3:
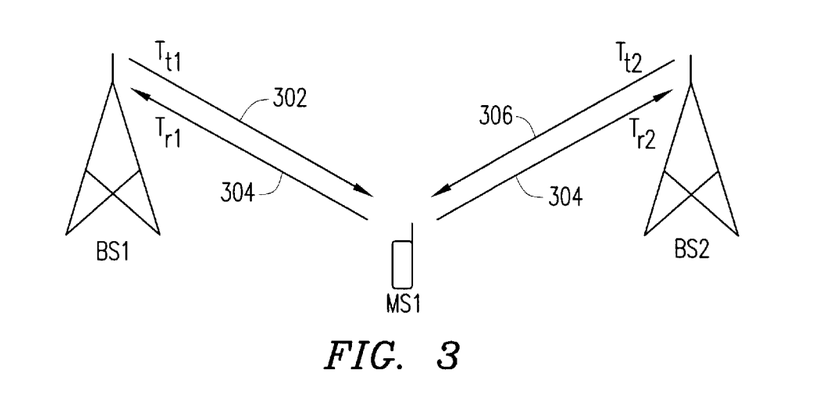
FIG. 3 is a simplified block schematic diagram of an MS that is in or is about to enter a SOHO and that can be used for facilitating improved timing calculations of BSs in an asynchronous CDMA mobile communications system, in accordance with a preferred embodiment of the present invention.

Referring now to FIG. 3, there is shown a schematic illustration of an MS that is in or is about to enter a SOHO. A first base station BS1 transmits a frame of a downlink signal 302 (either a pilot frame or a traffic data frame) at a time $T_{t1}$, as measured in the time base of the first base station BS1. An uplink signal 304 from a mobile station MS1 is received by the first base station BS1 at a time $T_{r1}$, also measured in the time base of the first base station BS1. Similarly, a second base station BS2 transmits a downlink signal 306 at a time $T_{t2}$ and receives the uplink signal 304 from the mobile station MS1 at a time $T_{r2}$, measured in the time base of the second base station BS2. Generally, the time base of the two base stations in an asynchronous network will have a relative time difference (RTD) $\Delta$. In other words, if an event (such as the transmission of a pilot frame) occurs at a time $T_1$ in the first base station BS1, a corresponding event will occur at a time $$T_2 = T_1 + \Delta \tag{1}$$

in the second base station BS2. Once the RTD $\Delta$ is known, it can be used by other MSs for mobile positioning.

In addition, each downlink signal has an offset $t_i$ relative to the transmit time of the pilot channel frame. Thus, the traffic channel data from the first base station BS1 is transmitted at a time $$T_{t1} = T_{p1} + t_1, \tag{2}$$

where $T_{p1}$ is the transmit time of the pilot channel frame from the first base station BS1. Similarly, the traffic channel data of the downlink signal from BS2 is transmitted at time $$T_{t2} = T_{p2} + t_2. \tag{3}$$

When the SOHO is initialized, the mobile station MS1 simply listens to the pilot and $t_2=0$. Later, when the mobile station MS1 is in SOHO, the second base station BS2 will transmit data and the offset $t_2$ of the signals will be adjusted so that the data from the first base station BS1 and the second base station BS2 will arrive at the mobile at approximately the same time. In the following discussion, a generic scenario can be considered in which it is assumed that the offsets $t_1$ and $t_2$ are known. This scenario covers both the cases of SOHO initialization and an already set-up SOHO.

Figure 4:
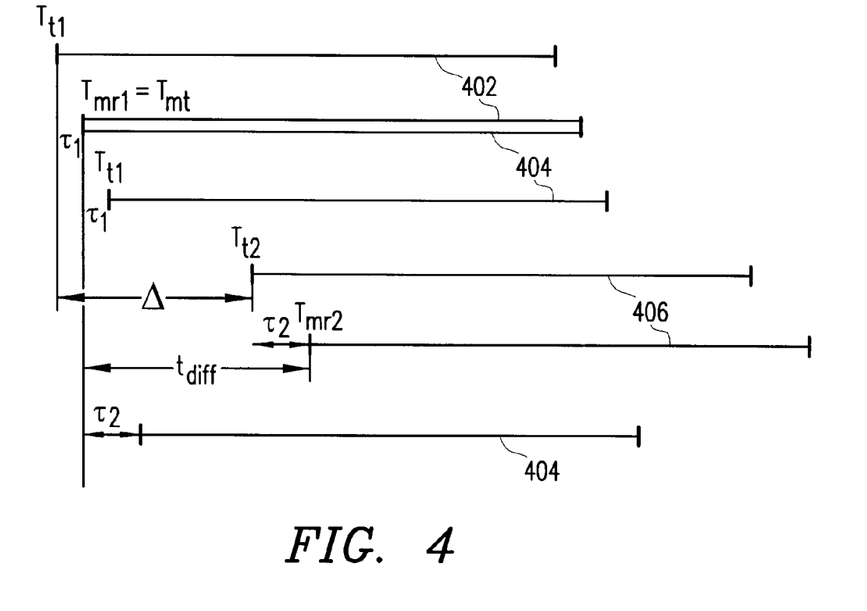
FIG. 4 is a diagram of the relative timing of signals involved in the SOHO scenario depicted in FIG. 3.

Referring now to FIG. 4, there is illustrated a relative timing diagram of the various SOHO signals that are transmitted and received in the system of FIG. 3. All of the times in the figure are illustrated in a common, arbitrary time base. For purposes of making RTD calculations in accordance with the present invention, however, the time of each event is reported in the local time base of the station (i.e., the MS or the BS) associated with that event.

At a time $T_{t1}$, as measured in the time base of the first base station BS1, a pilot or traffic frame 402 is transmitted by the first base station BS1. The frame 402 is received at the mobile station MS1 at a time $T_{mr1}$, which is measured in the time base of the mobile station MS1. The time $T_{mr1}$ is delayed after the transmission time $T_{t1}$ by a propagation delay time $\tau_1$, which is the time required for the signal to travel from the first base station BS1 to the mobile station MS1 and vice versa. The mobile station MS1 transmits its uplink signal 404 at time $T_{mt}$. For simplicity and without loss of general applicability, it can be assumed that the mobile station MS1 transmits its uplink signal 404 at the same time it receives the downlink signal 402 from the first base station BS1. Thus, $$T_{mt} = T_{mr1}, \text{ and} \tag{4}$$

the uplink signal 404 is received in the first base station BS1 at time $$T_{r1} = T_{t1} + 2\tau_1. \tag{5}$$

The uplink signal 404 from the mobile station MS1 is received in the second base station BS2 at a time $T_{r2}$ and is delayed after the transmission time $T_{mt}$ by a propagation delay time $\tau_2$.

The second base station BS2 also transmits a traffic or pilot frame 406 at a time $T_{t2}$. After the propagation delay time $T_2$, the downlink signal 406 is received by the mobile station MS1 at a time $T_{mr2}$.

To calculate the RTD $\Delta$, the mobile station MS1 reports the time difference $t_{diff}$ between the reception time $T_{mr2}$ of the downlink signal 406 from the second base station BS2 and the transmit time $T_{mt}$ of the uplink signal 404 from the mobile station MS1. Thus, $$t_{diff} = T_{mt} - T_{mr2}. \quad (6)$$

It should be noted that in FIG. 4, the time difference $t_{diff}$ is relatively large, which is typically indicative of an initial acquisition scenario.

Using the above notations, we can then formulate the following expression for the receive time $T_{r2}$ of the uplink signal in the second base station BS2:

$$T_{r2} = 2\tau_2 + t_{diff} + T_{t2}. \quad (7)$$

Finally, we can formulate the following expression for $t_{diff}$:

$$t_{diff} = T_{t1} - T_{t2} + \tau_1 - \tau_2 + \Delta, \quad (8)$$

which is obtained by subtracting the arrival time $T_{mr2}$ of the downlink signal 406 from the second base station BS2 (either the pilot frame at SOHO initialization or the traffic data during SOHO) from the transmission time $T_{mt}$ of the uplink signal 404 from the mobile station MS1, all measured in the time base of the second base station BS2. Thus, as will be understood by persons of ordinary skill in the art, in the time base of the second base station:

$$T_{mr2} = T_{r2} - t_2, \text{ and} \quad (9)$$

$$T_{mt} = T_{t1} + \Delta + \tau_1. \quad (10)$$

Now there are three equations: (5), (7), and (8), and three unknowns: 1) the propagation delay time $\tau_1$ between the mobile station MS1 and the first base station BS1; 2) the propagation delay time $\tau_2$ between the mobile station MS1 and the second base station BS2; and 3) the time difference $\Delta$ between the first base station BS1 and the second base station BS2. It is easy to solve for $\Delta$ to get $$\Delta = \tfrac{1}{2}(t_{diff} - T_{t1} - T_{r1} + T_{t2} + T_{r2}), \quad (11)$$

which provides a solution for the desired RTD $\Delta$ between the base stations BS1 & BS2.

According to a preferred embodiment of the invention, the mobile station MS1 reports the time difference $t_{diff}$ and each of the base stations BS1 & BS2 report their respective transmit and receive times to the network. The computation of the RTD $\Delta$ is then made in the BSC or the MSC. In the alternative, the computation can be performed in the mobile station MS1 or in a base station once the necessary timing data is provided.

Figure 5:
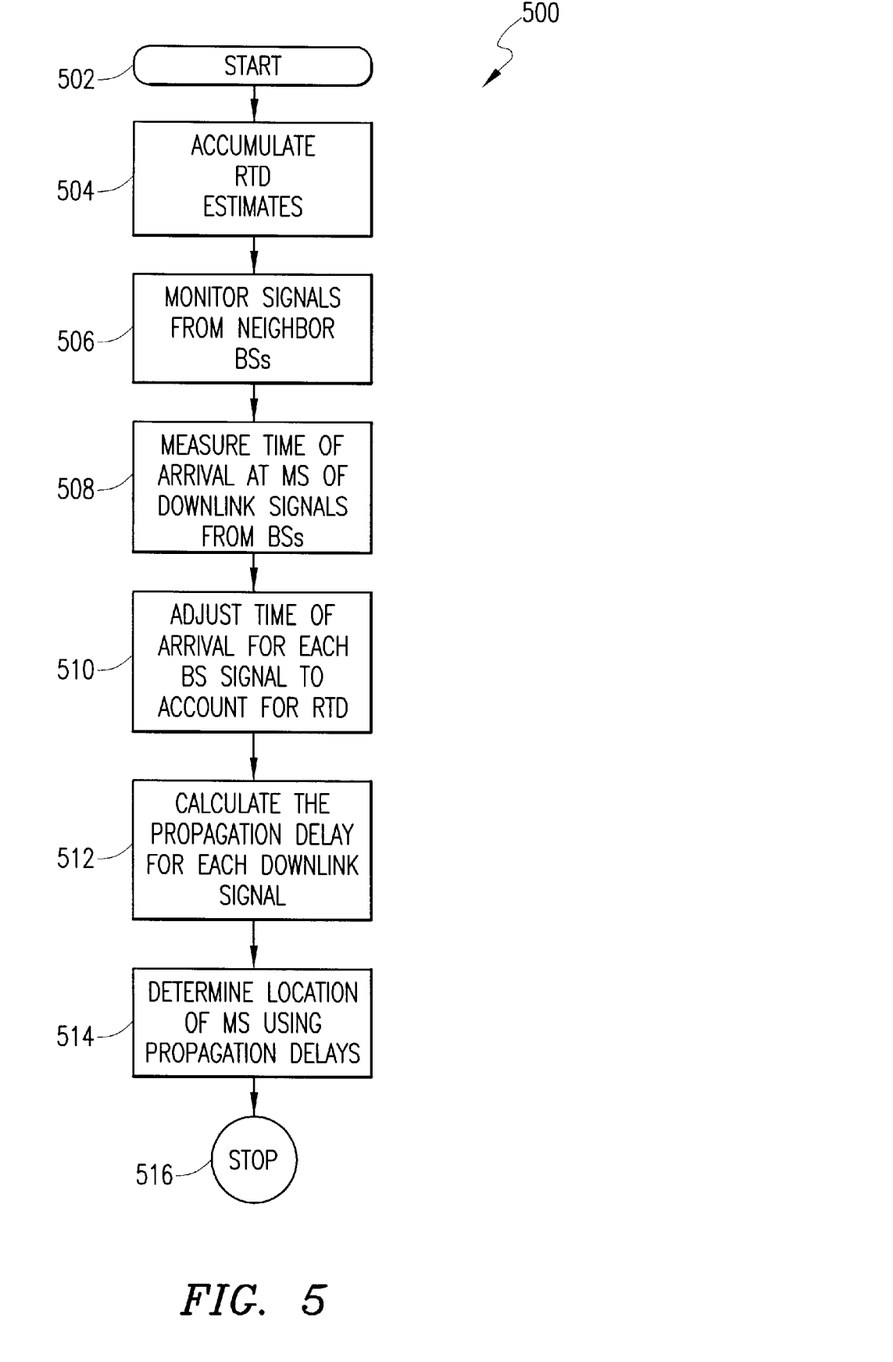
FIG. 5 is a flow diagram that illustrates an exemplary method that can be used to determine the position of an MS, in accordance with one embodiment of the present invention.

By calculating improved RTD estimates between various pairs of BSs in an asynchronous mobile communications system, an uplink solution or a downlink solution can be used to determine the position of MSs in the system without the need for an absolute time reference. For example, FIG. 5 is a flow diagram that illustrates one possible method 500 for facilitating the timing of BSs and determining the position of a selected MS in an asynchronous CDMA mobile communications system, in accordance with one embodiment of the present invention. As will be appreciated by those of ordinary skill in the art, numerous other positioning methods, such as TOA or TDOA, can also be used in connection with the improved RTD estimate to facilitate positioning in accordance with the invention. At step 504, a BSC calculates a plurality of improved RTD estimates between various pairs of BSs that are controlled by the BSC or that are listed in the neighbor cell list. This calculation is made by using data provided by other MSs in the mobile communications system. Accordingly, the effect of propagation delays are taken into account so as to calculate highly accurate RTD estimates. Preferably, a table of these improved RTD estimates is maintained in a database at the BSC. At step 506, the selected MS monitors the BSs in neighboring cells. For purposes of the present positioning method 500, this involves monitoring, for example, a known sequence that is periodically transmitted by the BSs. This monitoring procedure can include the ordinary monitoring of BSs for potential handover candidates. It should be noted that monitoring of a known sequence from a BS can usually be performed even in cases where limited "hearability" prevents a SOHO with that BS.

At step 508, the MS measures the TOA of downlink signals transmitted by several different BSs. Each TOA measurement can be measured in the time base of the MS or as a relative value to the source BS or to some other BS. The TOA measurements are temporarily stored in local memory along with information identifying the BS that corresponds to each TOA measurement. This data is then sent to the BSC for further processing. The measurements of step 508 can be made on the pilot channel data or the traffic channel data. Because the BSs generally "know" the offsets $t_j$, the time difference between the BSs (i.e., the time difference between the pilot frame transmissions of the BSs) is known even when traffic channel is used. At step 510, the BSC adjusts the TOA measurements to account for the RTDs between the various BSs by adding the RTD estimates to the TOA measurements. At step 512, a propagation delay time is calculated for each downlink signal using the adjusted TOA measurements, and the location of the MS is estimated at step 514 using the calculated propagation delay times. The positioning information can then, for instance, be transmitted to the MS, stored at the BSC, or sent to the Home Location Register (HLR). In an alternative embodiment, the calculations of steps 510, 512, and 514 can also be made in the MS, MSC, or some other location in the network.

The method 500 illustrated in FIG. 5 provides positioning estimates based upon measurements made at the MS of the TOA of a downlink signal. In another alternative embodiment, mobile positioning is determined using an uplink signal. The uplink solution is essentially the same as the downlink solution except that, instead of measuring the TOA of downlink signals at step 508, TOA measurements are made at multiple BSs on an uplink signal that is transmitted by the MS. These uplink signal measurements are then provided to the BSC or the MSC, and adjusted TOA measurements and propagation delay times are calculated, as in steps 510 and 512 of the downlink solution method 500.

As discussed above in connection with the standard RTD estimates, the uncertainty in the improved RTD estimates will also increase with time if the RTD estimate table for a particular BS is not updated. For positioning purposes, however, the required accuracy of the RTD estimates is much greater than in the context of cell-searches. Thus, the improved RTD estimates obtained during SOHO should be recent enough so that the clocks in the BSs have not drifted compared to each other. Otherwise, it will be difficult, if not impossible, to perform accurate mobile positioning determinations. Many of the same methods described above for addressing the uncertainty problem in the standard RTD estimate context can be used in a similar manner to address uncertainty in the improved RTD estimate context.

The method of obtaining an improved RTD estimate can also be used to further improve the cell-search process described in connection with FIGS. 1 and 2. In one preferred embodiment of the cell-search method 100 (see FIG. 1), the time difference reported by the MS in SOHO is directly used to calculate the RTD estimates; no information from the BS is required. Thus, referring again to FIG. 4, the standard RTD estimate is equal to an MS's receive time $T_{mr1}$ of a downlink signal from a first base station BS1, subtracted from the MS's receive time $T_{mr2}$ of a downlink signal from a second base station BS2. In FIG. 4, this value is illustrated by the time differential $t_{diff}$. The direct use of the time difference as reported by the MS offers a significant improvement over prior cell-search procedures and, in most cases, sufficiently reduces the complexity of the cell-search process to overcome the problems found in other potential positioning methods.

If greater accuracy is required, however, the timing uncertainty in the MSs that do SOHO searches can be further reduced by as much as fifty percent by using an improved RTD estimate that takes propagation delays into account. By using improved RTD estimates, the set of time delays that the MS has to search during the cell-search process is considerably decreased, especially when compared to prior art cell-search methods. The cell-search uncertainty interval will then depend upon the size of the cell and the amount of sectorization of the cell. For example, in a non-sectorized cell system having a cell radius of approximately 30 kilometers, the uncertainty is less than 300 microseconds, assuming that the position of the mobile can be estimated to within 3 cell radii. The normal search window for prior cell-search methods, in contrast, is about 10 milliseconds. Thus, the use of an improved estimated RTD provides a two-orders-of-magnitude improvement in the search complexity. The results are even better in cellular systems with smaller cells or with sectorized cells. It is also possible to decrease the uncertainty interval for the cell-search even further by estimating the round-trip delay between a target BS and the mobile that is performing the cell-search, especially in the case of sectorized cells. An estimated round-trip delay can easily be calculated from the data available when making RTD calculations or if the approximate location of the mobile is known.

Although several preferred embodiments of the method and apparatus of the present invention have been illustrated in the accompanying Drawings and described in the foregoing Detailed Description, it will be understood that the invention is not limited to the embodiments disclosed. For example, measurements of the relative timing of BSs, made in accordance with the present invention, could also be used for the pseudo-synchronization of BSs. Thus, the invention is capable of numerous rearrangements, modifications and substitutions without departing from the spirit of the invention as set forth and defined by the following claims.

What is claimed is:

1. A method for estimating a relative timing of a plurality of base stations in an asynchronous mobile communications system, comprising the steps of:
   receiving at a first mobile station a first downlink signal transmitted by a first one of said base stations and a second downlink signal transmitted by a second one of said base stations;
   transmitting an uplink signal from the first mobile station to the first and second base stations; and
   calculating an estimated relative time difference between the time base of said first base station and the time base of said second base station using receive times at the first and second base stations of said uplink signal, transmit times of the first downlink signal and the second downlink signal, and a time difference at the first mobile station between a receive time of the second downlink signal and the transmit time of said uplink signal, wherein the receive times of the uplink signal and the transmit times of the first and second downlink signals are in the time base of the base station transmitting or receiving the respective signal, said calculation accounting for propagation delays between said first mobile station and said first and second base stations.

2. The method of claim 1, further comprising the step of utilizing the estimated relative time difference to calculate at least one possible location of a second mobile station relative to at least one of said first and second base stations by determining a distance between the second mobile station and at least one of said first and second base stations.

3. The method of claim 2, further comprising the step of determining a location of the second mobile station by using a plurality of relative time differences between a plurality of different pairs of base stations to calculate a distance between the second mobile station and each of a plurality of said base stations.

4. The method of claim 1, further comprising the step of determining at least one possible location of a second mobile station using the receive times at said first base station and said second base station of an uplink signal transmitted by said second mobile station and using said estimated relative time difference.

5. The method of claim 1, further comprising the step of determining at least one possible location of a second mobile station using receive times at the second mobile station of downlink signals transmitted by each of said first and second stations and using said estimated relative time difference.

6. The method of claim 1, further comprising the step of transmitting the value of the estimated relative time difference to a second mobile station.

7. The method of claim 6, further comprising the steps of:
   estimating a propagation delay of signals transmitted between the second mobile station and the first base station and of signals transmitted between the second mobile station and the second base station based on an approximate location of the second mobile station;
   adjusting the estimated relative time difference value by factoring in the estimated propagation delays to determine a local estimated relative time difference value at the mobile station;
   said second mobile station correlating said local estimated relative time difference value with a matched filter output signal; and
   initiating a cell search based on a result of the correlating step.

8. The method of claim 6, further comprising the steps of:
   said second mobile station correlating the estimated relative time difference value with a matched filter output signal; and
   initiating a cell search based on a result of the correlating step.

9. The method of claim 1, wherein said estimated relative time differences are used to synchronize said first and second base stations.

10. The method of claim 1, further comprising the step of storing the computed difference in a relative time difference table.

11. The method of claim 1, wherein said first mobile station is in a state of handover.

12. A method for facilitating timing between mobile stations and base stations in an asynchronous mobile telecommunications network, comprising the steps of:

receiving relative timing difference data from each of a plurality of mobile stations, the relative timing difference data from each mobile station including a measured difference between the time bases of at least two base stations as measured by said mobile stations;

determining a relative timing difference estimate based on the received relative timing difference data, the relative timing difference estimate representing an estimate of a difference between the time bases of at least two base stations;

accounting for propagation delays between a measuring mobile station and the at least two base stations of which the time base difference is measured in said relative timing difference estimate;

storing the relative timing difference estimate in a relative timing difference table;

transmitting the relative timing difference estimate to a receiving mobile station.

13. The method of claim 12, wherein the relative timing difference estimate is determined by calculating a relative timing difference estimate value from a plurality of measured differences received from the plurality of mobile stations.

14. The method of claim 12 further comprising the steps of:

estimating an error range for the relative timing difference estimate; and transmitting the error range to the receiving mobile station.

15. The method of claim 12, wherein the relative timing difference estimate transmitted to the receiving mobile station is used to estimate a position of the receiving mobile station.

16. The method of claim 12, wherein the relative timing difference estimate comprises the measured difference received from one of the plurality of mobile stations.

17. The method of claim 12, wherein the relative timing difference estimate transmitted to the receiving mobile station is used to assist in synchronizing the receiving mobile station with a cell.

18. The method of claim 12, wherein data from a neighbor cell list is transmitted along with the relative timing difference estimate.

19. An asynchronous mobile telecommunications system, comprising:

a plurality of base stations for transmitting data to and receiving data from a plurality of mobile stations, the plurality of base stations individually receiving relative timing difference data, the relative timing difference data from each mobile station comprising a measured difference between the time bases of two of the plurality of base stations as measured by the mobile station;

a register storing a relative timing difference table, each of a plurality of entries in said table comprising a relative timing difference estimate calculated from the relative timing difference data and said register storing error data for each relative timing difference estimate; and wherein a first one of the plurality of base stations transmits a relative timing difference estimate to a receiving mobile station to facilitate timing of communications between the mobile station and a second one of the plurality of base stations.

20. The system of claim 19 wherein the register further stores a neighbor cell list.

21. A method for facilitating the timing of a plurality of base stations in an asynchronous mobile communications system, comprising the steps of:

at least one of said plurality of base stations sending at least one estimated relative time difference value to a mobile station, said at least one estimated relative time difference value comprising an estimated timing difference between said at least one of said plurality of base stations and a neighbor base station;

said mobile station receiving said at least one estimated relative time difference value;

said mobile station correlating said at least one estimated relative time difference value with a matched filter output signal; and initiating a cell search based on a result of the correlating step.

22. The method of claim 21, wherein the correlating step comprises:

comparing said at least one estimated relative time difference value to said matched filter output signal; and determining if said at least one estimated relative time difference value is likely to correspond to a matched filter output signal peak.

23. The method of claim 22, wherein the initiating step comprises selecting a scrambling code based on a result of the determining step.

24. The method of claim 21, further comprising the step of estimating a propagation delay between said mobile station and at least one of said base stations, said estimated propagation delay used to reduce uncertainty in said correlating step.

25. The method of claim 21, wherein said mobile station transmits said at least one estimated relative time difference value along with a neighboring-cell quality report to said at least one of said plurality of base stations.

26. The method of claim 25, wherein a base station controller associated with said at least one of said plurality of base stations stores said at least one estimated relative time difference in a database.

27. The method of claim 21, wherein the sending step comprises broadcasting or transmitting said at least one estimated relative time difference value in a neighbor list message.

28. The method of claim 27, wherein said neighbor list message includes at least-one scrambling code associated with said neighbor base station.

29. The method of claim 21, wherein the sending step further comprises sending an uncertainty value associated with said at least one estimated relative time difference value.

30. The method of claim 21, wherein the mobile communications system comprises an asynchronous DS-CDMA system.

31. A method for facilitating the timing of a plurality of base stations in an asynchronous mobile communications system, comprising the steps of:

at least one of said plurality of base stations sending at least one estimated relative time difference value to a mobile station, said at least one estimated relative time difference value comprising an estimated timing difference between said at least one of said plurality of base stations and a neighbor base station;

said mobile station receiving said at least one estimated relative time difference value; and determining an approximate position of the mobile station using said at least one estimated relative time difference value.

32. The method of claim 31 wherein said step of determining an approximate position comprises the steps of:

calculating a time difference at the mobile station between receive times of a first downlink signal transmitted by said at least one of said plurality of base stations and a second downlink signal transmitted by said neighbor base station; and comparing said at least one relative time difference value with said calculated time difference to determine at least one possible location of said mobile station relative to said at least one of said plurality of base stations and said neighbor base station.

33. A system for synchronizing a plurality of base stations in a mobile communications system, comprising:

a first base station of said plurality of base stations, said first base station operable to broadcast or transmit at least one estimated relative time difference value, said at least one estimated relative time difference value comprising an estimated timing difference between said first base station and a neighbor base station;

a mobile station for receiving said at least one estimated relative time difference value; and a processor for determining an approximate position of the mobile station using said at least one estimated relative time difference value.

34. The system of claim 33, wherein said processor compares said at least one estimated relative time difference value with a time difference measured by said mobile station to determine at least one possible location of said mobile station relative to said first base station and said neighbor base station.

35. A system for synchronizing a plurality of base stations in a mobile communications system, comprising:

a first base station of said plurality of base stations, said first base station operable to broadcast or transmit at least one estimated relative time difference value and at least one uncertainty value associated with said at least one estimated relative time difference value, said at least one estimated relative time difference value comprising an estimated timing difference between said first base station and a neighbor base station; and a mobile station for receiving said at least one estimated relative time difference value and said at least one uncertainty value.

36. The system of claim 35, wherein said mobile station is operable to correlate said at least one estimated relative time difference value with a matched filter output signal and initiate a cell search.

37. The system of claim 36, wherein said mobile station is operable to compare said at least one estimated relative time difference value to said matched filter output signal, and determine if said at least one estimated relative time difference value is likely to correspond to a matched filter output signal peak.

38. The system of claim 36, wherein said mobile station is operable to select a scrambling code based on a result of correlating said at least one estimated relative time difference value with a matched filter output signal peak.

39. The system of claim 35, wherein said mobile station transmits said at least one estimated relative time difference value along with a neighboring-cell quality report to said first base station.

40. The system of claim 35, wherein a base station controller associated with said first base station stores said at least one estimated relative time difference in a database.

41. The system of claim 35, wherein said first base station is operable to broadcast or transmit said at least one estimated relative time difference value in a neighbor list message.

42. The system of claim 35, wherein the mobile communications system comprises an asynchronous DS-CDMA system.

* * * * *

UNITED STATES PATENT AND TRADEMARK OFFICE
CERTIFICATE OF CORRECTION

PATENT NO.     : 6,526,039 B1                                             Page 1 of 1
DATED          : February 25, 2003
INVENTOR(S)    : Dahlman et al.

It is certified that error appears in the above-identified patent and that said Letters Patent is hereby corrected as shown below:

Column 1,
Line 54, replace "SOHOS" with -- SOHOs --

Column 6,
Line 8, replace "RTDS" with -- RTDs --

Column 11,
Line 1, replace "signal 406" with -- signal 404 --

Column 15,
Line 43, replace "with a cell" with -- with a base station --

Signed and Sealed this

Tenth Day of February, 2004

JON W. DUDAS
*Acting Director of the United States Patent and Trademark Office*